Oct. 18, 1955    J. D. RICHARD, JR    2,721,101
SOIL MOISTURE CONTROL
Filed Sept. 23, 1953
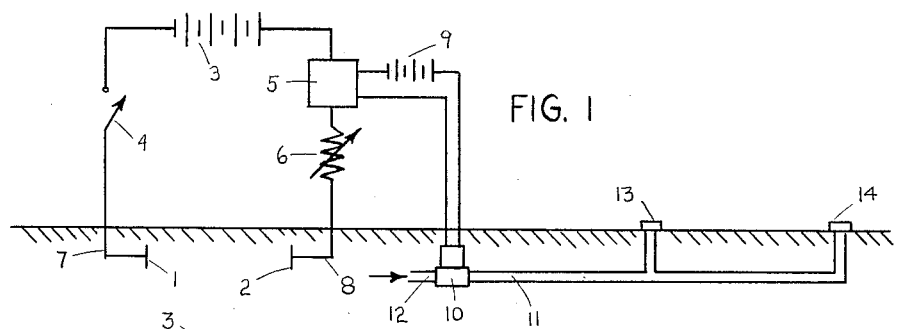
FIG. 1
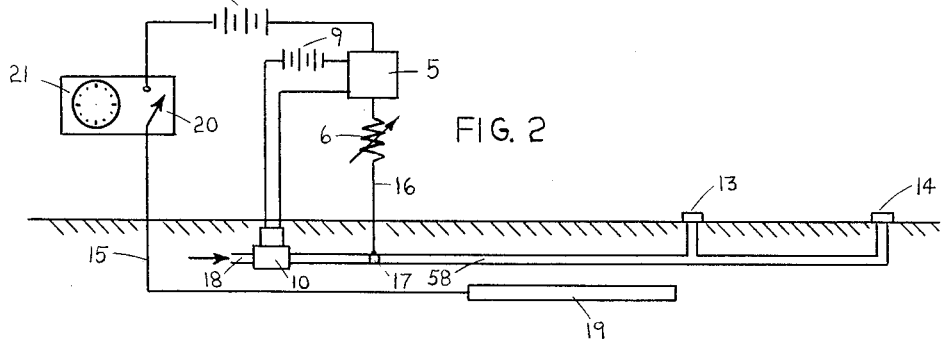
FIG. 2
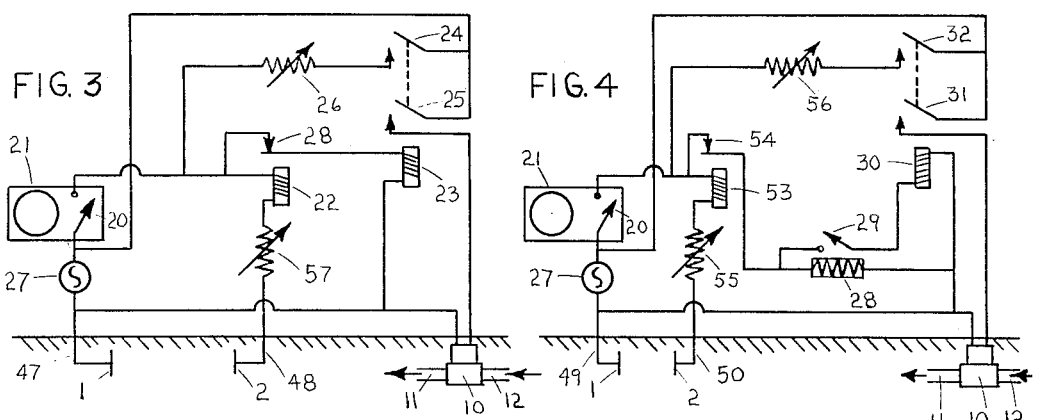
FIG. 3
FIG. 4
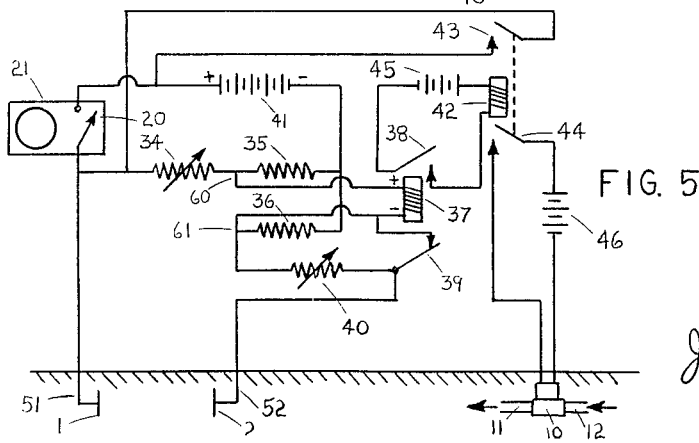
FIG. 5
INVENTOR
Joseph D. Richard Jr.

United States Patent Office 2,721,101
Patented Oct. 18, 1955

2,721,101

SOIL MOISTURE CONTROL

Joseph D. Richard, Jr., Miami, Fla.

Application September 23, 1953, Serial No. 381,908

8 Claims. (Cl. 299—25)

This invention is a method for regulating the moisture content in soil, and it comprises, basically, the combination of a pair of electrodes buried in the soil, a source of electrical voltage across the electrodes, a current discriminating device in series with the electrodes, and in a specific embodiment, a solenoid valve which is opened by the current discriminating device when the current is less than some pre-set value.

It is the object of my invention to provide a means for automatically adding water to the soil when the soil humidity falls below a certain pre-set concentration.

It has been established, that for a given type of soil, the electrical conductivity will vary with the moisture content. As the moisture content increases, the conductivity also increases, and as the moisture content decreases the conductivity decreases. The change in conductivity with moisture content varies considerably for different types of soil but in all types the conductivity change is large enough so that moisture variations are easily detected.

In one form of my invention a lawn sprinkler system is controlled by the soil conductivity sensing device in such a manner that when the soil moisture falls below a desired concentration the lawn sprinkler is turned on. The sprinkler operates until the soil conductivity reaches a preset value and then is automatically turned off. A clock mechanism is included to turn the soil conductivity sensing device on at a desired time. For example, the clock mechanism can be set to turn on the sensing device every day at a certain hour. If the soil is too dry the sprinkler is automatically turned on and it remains on until the soil moisture reaches the desired preset concentration as determined by its conductivity. If the moisture content of the soil is at a satisfactory level the sprinkler system does not operate.

A variable resistance is provided in series with the electrodes so that the operating conductivity can be adjusted. For a specific soil type and electrode arrangement, the conductivity is indicative of a certain predetermined moisture content. By the adjustment of a resistance in series with the electrodes the soil moisture concentration at which the lawn sprinkler will be actuated can be varied. Thus the soil moisture sensing device can be adjusted to control the lawn sprinkler in such a manner that any desired soil moisture concentration can be maintained automatically.

In a further specific embodiment of my invention I provide a means for controlling the length of time that the lawn sprinkler will operate after it has been automatically turned on. It is widely recognized that lawns should not be watered too frequently but that they should be watered thoroughly when they are watered to encourage deep root growth. In my invention this is achieved by switching in an additional adjustable resistance in series with the electrodes at the same time the water sprinkler is turned on. Thus the soil conductivity will have to be increased by the addition of water until the added resistance is compensated for. When the total series resistance gets low enough, that is, when the soil conductivity gets high enough, sufficient current will flow to cut off the sprinkler system.

Thus the soil moisture concentration at which the sprinkler system will automatically turn on can be set at any desired level, and independently, the soil moisture concentration at which the sprinkler system will automatically turn off can also be set at any desired level.

In one form of my invention the underground pipe of the sprinkler system constitutes one of the electrodes. The other electrode can be situated a substantial distance from the pipe so that the electrical path between them through the soil is representative of the soil conductivity. The electrodes must be situated so that the soil separating them will be moistened by the water sprinkler. Further, the soil between the electrodes should be typical of the whole area over which the soil moisture is to be controlled. For this reason it is desirable to utilize large electrodes spaced a considerable distance apart so that the conductivity between the electrodes is a good average of the soil conductivity over the entire area being controlled by the sprinkler system.

Several embodiments of the present invention will now be described in conjunction with the accompanying drawings in which, Figure 1 shows schematically the general organization of my invention including a soil moisture sensing means with an associated lawn sprinkling system.

Figure 2 shows another embodiment in which a pipe of the lawn sprinkler system constitutes one of the sensing electrodes.

Figure 3 shows a specific embodiment in which a relay serves as the current discriminating means.

Figure 4 shows a soil moisture regulating device similar to the one shown in Figure 3 to which a thermal delay relay has been added.

Figure 5 shows a soil moisture regulating device in which the resistance between the two underground electrodes constitutes the variable arm of a resistance bridge.

Referring more specifically to Figure 1, a pair of electrodes 1 and 2 are shown in electrical contact with the soil. A voltage source 3 is applied across the electrodes by means of switch 4 and conducting leads 7 and 8. In series with the electrodes 1 and 2 are a variable resistance 6 and current discriminating means 5 which controls the connection of voltage source 9 to the solenoid valve 10. The solenoid valve 10 when opened by the voltage source 9 admits water from pipe 12 through the valve to pipe 11 and out the sprinklers 13 and 14.

Figure 2 shows a clock mechanism 21 which can be set to close the contact 20 at a desired time. The contact 20, when closed, applies the voltage source 3 through the conducting leads 15 and 16 across the electrode 19 and the pipe 58. The conducting lead 16 is shown connected to the pipe 58 at 17. The electrical resistance through the soil between the electrode 19 and the pipe 58 (which also serves as an electrode) is used as a measure of the soil humidity. Shown in series with the two functional electrodes 19 and 58 is an adjustable resistance 6 and current discriminating means 5 which connects the voltage source 9 to the solenoid valve 10 when the current through the discriminating means 5 is less than some preset value. The solenoid valve 10, when opened by the voltage source 9 admits water from the pipe 18 through the pipe 58 and out the sprinklers 13 and 14.

Figure 3 shows a clock mechanism 21 which can be set to close the contact 20 at some desired time. When the contact 20 is closed the voltage source 27 is connected across the electrodes 1 and 2 through the conducting leads 47 and 48. Shown in series with the electrodes are a relay coil 22 and an adjustable resistance 57. The relay coil 22 controls the normally closed contact 28 which connects the voltage source 27 across the relay coil 23. Associated with the relay coil 23 are the normally open contacts 24 and 25. Contact 25 when closed connects the voltage source 27 to the solenoid valve 10. The solenoid valve 10 when opened by the voltage source 27 admits water from the pipe 12 through the pipe 11. Shown in series with the contact 24 is an adjustable resistance 26. The relay coil 22 with its associated contact 28 constitutes a fast acting relay. The relay coil 23 with its contacts 24 and 25 constitutes a slower acting or delay relay.

Figure 4 shows a clock mechanism 21 which can be set to close the contact 20 at some desired time. When the contact 20 is closed the voltage source 27 is connected across the electrodes 1 and 2 through the conducting leads 49 and 50. Shown in series with the electrodes 1 and 2 are a relay coil 53 and an adjustable resistance 55. The relay coil 53 controls the normally closed contact 54 which connects the voltage source 27 to the thermal element 28. The thermal element 28 with its associated contact 29 constitutes a thermal delay relay. The normally open contact 29 when closed by the thermal element 28 connects the voltage source 27 to the relay coil 30. The relay coil 30 controls the normally open contacts 31 and 32. When the contact 31 is closed by the relay coil 30 the voltage source 27 is connected to the solenoid valve 10. When the solenoid valve 10 is opened by the voltage source 27 through the contact 31 water is admitted from the pipe 12 through the pipe 11. Shown in series with the relay contact 32 is an adjustable resistance 56.

Figure 5 shows a pair of electrodes 1 and 2 in contact with the soil. The resistance between 1 and 2 constitutes a variable resistance which varies with the soil humidity. The electrodes 1 and 2 are connected into a conventional resistance bridge by means of the conducting leads 51 and 52. The adjustable resistance 34 constitutes an adjustable arm of the resistance bridge. The resistance elements 35 and 36 constitue the two fixed arms of the resistance bridge. The resistance between electrodes 1 and 2 constitutes the variable arm of the resistance bridge. The clock mechanism 21 can be set to close the contact 20 at some desired time. The contact 20, when closed, connects the voltage source 41 across the resistance bridge. Also connected across the bridge is the polarized relay coil 37 which controls the normally open contact 38 and the normally closed contact 39. The contact 38, when closed, connects the voltage source 45 to the relay coil 42. The contact 39, which normally shunts the adjustable resistance 40, opens the shunt when the relay is actuated and places the adjustable resistance 40 in series with the electrodes 1 and 2. The relay coil 42 controls the normally open contacts 43 and 44. The contact 44, when closed, connects the voltage source 46 to the solenoid valve 10. The solenoid valve 10 when opened by the voltage source 46 allows water from the pipe 12 to pass through to the pipe 11. The contact 43 when closed shunts the contact 20.

Returning again to Figure 1, the operation of the soil humidity sensing device will be described in more detail. When the contact 4 is closed the voltage 3 is connected across the electrodes 1 and 2. The electrical resistance between 1 and 2 will be a function of the soil humidity; the exact relationship having previously been determined and the adjustable resistance 6 having been set. If the current through the current discriminating means 5 is less than some predetermined threshold value, which has previously been established to indicate the minimum acceptable soil moisture concentration, the voltage source 9 is connected to open the solenoid valve 10. Figure 1 is intended to show the overall organization of electrodes, current discriminating means, solenoid valve, and water sprinkling system. The current discriminating means 5 is shown only in block diagram and practical means for achieving this result are described in detail in the later figures.

Figure 2 shows schematically the overall organization of coacting parts equivalent to that shown in Figure 1 except in Figure 2 the pipe serves as one of the electrodes. The electrode 19 is situated a substantial distance from the pipe 58 so that the electrical resistance through the soil between the two electrodes is indicative of the average soil humidity for the area under consideration. A clock mechanism 21 is arranged to close the contact 20 at some preset time.

Figure 3 shows a timing mechanism 21 which closed the momentary contact 20 at some preset time. A critical value of soil conductivity is established to represent a minimum desired soil humidity. The adjustable resistance 57 is adjusted so that the relay 22 is actuated when the soil conductivity is at or above the critical value. When the momentary contact 20 closes, if the soil humidity is adequate, the relay 22 is actuated and contact 28 is opened. Since the relay 23 is a slower acting or delay relay it does not have time to operate before the contact 28 is opened. When the momentary contact 20 opens the voltage source 27 is unconnected. The solenoid valve remained closed since the soil humidity (as measured by its conductivity) was sufficiently high.

If in Figure 3 the momentary contact 20 was closed and the soil humidity was too low (the resistance too high) the relay 22 would not be actuated. Consequently the relay 23 would close and the solenoid valve 10 would open. The adjustable resistance 26 would be inserted in series with the electrodes by the contact 24 after the momentary contact 20 opened. The momentary contact has been bypassed through the resistance 26 and the contact 24 to enable the system to operate until shut off by the increased conductivity of the soil as the water is added. Since an additional resistance has been inserted in series with the electrodes the critical soil conductivity will have to be exceeded (the amount depending on the value of the resistance 26) by the addition of water to the soil before sufficient current flows to actuate the relay 22. When the soil humidity gets high enough the relay 22 is actuated and the system is disconnected from the voltage source 27 and the solenoid valve 10 closes. If the resistance 26 had not been inserted in series with the electrodes the system would have turned itself off as soon as the soil humidity reached the minimum acceptable concentration. With the adjustable resistance 26 the amount of watering past the minimum acceptable soil conductivity can be readily controlled.

The operation of the soil moisture control device shown schematically in Figure 4 is similar to the one previously described except that a thermal delay relay has been added. When the momentary contact 20 is closed by the timing mechanism 21, the voltage source 27 heats the thermal element 28 and after a certain time delay the contact 29 closes actuating the relay coil 30.

As as alternate method of operation in Figure 4 the contact 27 of the thermal element 28 can be used to control the solenoid valve 10 directly without the use of the relay 30.

It is apparent that the relay contact 54 could also control the solenoid valve 10 directly in a simplified arrangement as shown in Figure 1.

Figure 5 shows a soil moisture control device in which a momentary contact 20, when closed by the clock mechanism 21, places the voltage source 41 across the resistance bridge. A polarized relay coil 37 is also connected across the resistance brige at 60 and 61. The adjustable resistance 34 is set so that the relay 37 is actuated when the resistance between the electrodes 1 and 2 gets higher than some predetermined value (indicative of the minimum acceptable soil moisture concentration). Since the relay 37 is polarized it is only actuated when the resistance between the electrodes 1 and 2 gets too high. When the reelay 37 is actuated, the contact 38 closes and the contact 39 opens. When the contact 38 closes, the voltage 45 is connected to the relay coil 42 and the normally open contacts 43 and 44 are closed. When the contact 44 closes, the voltage 46 opens the solenoid valve 10. When the contact 43 closes it shunts the contact 20. When the normally closed contact 39 opens it places the normally shunted resistance 40 in series with the electrodes 1 and 2. Resistance 40 can be adjusted to control the amount of watering that is desired in excess of the amount it would normally take to restore the bridge to balance and deactivate the relay 37.

Although the above method of regulating soil moisture is especially applicable to the control of lawn sprinklers, it can also be used to control irrigation systems, overhead watering systems, and electrically driven water pumps.

From the foregoing description it will be readily seen that I have provided a system of soil moisture control which offers wide opportunities for adaptation. Those skilled in the art will readily perceive many modifications of the above described apparatus and method falling within the scope and spirit of my invention.

I claim:

1. A soil moisture regulating device comprising in combination: a pair of electrodes both of which are in contact with the soil; a source of voltage across said electrodes; current discriminating means in series with said electrodes; a solenoid valve responsive to said current discriminating means; a source of water controlled by said solenoid valve; and means for inserting an adjustable resistance in series with said electrodes at substantially the same time as the solenoid valve is opened, said adjustable resistance being a means for controlling the amount of water to be added to the soil before said solenoid valve is automatically closed in response to said current discriminating means.

2. The device of claim 1 further characterized by the use of an underground water pipe of an irrigation system as one of the said electrodes in contact with the soil.

3. Soil moisture control apparatus comprising in combination: a pair of electrodes in contact with the soil; a voltage source; switching means for connecting said voltage across said electrodes; a current responsive relay the coil of which is in series with said electrodes; a solenoid valve; means responsive to said relay for controlling said solenoid valve; a source of water controlled by said solenoid valve; and a second switching means whereby an adjustable resistance is inserted in series with said electrodes at substantially the same time as said solenoid valve is opened.

4. Soil moisture control apparatus comprising in combination: a pair of electrodes in contact with the soil; a voltage source; switching means for connecting said voltage across said electrodes; timing means for periodically operating said switching means; a relay, the coil of which is connected in series with said electrodes; a thermal delay relay controlled by said relay; a solenoid valve controlled by said thermal delay relay; a source of water controlled by said solenoid valve; and means whereby an adjustable resistance is inserted in series with said electrodes at substantially the same time as said solenoid valve is opened.

5. Soil moisture control apparatus comprising in combination: a pair of electrodes in contact with the soil; a resistance bridge, the resistance between the aforementioned electrodes constituting a variable resistance arm of said resistance bridge; a voltage source; switching means for connecting said voltage across said resistance bridge; control means responsive to the condition of balance of said resistance bridge; a solenoid valve responsive to said control means; a source of water controlled by said solenoid valve; and means for inserting an adjustable resistance in series with said electrodes at substantially the same time as said solenoid valve is opened.

6. Soil moisture control apparatus comprising in combination: a pair of electrodes in contact with the soil; a resistance bridge, the resistance between the aforementioned electrodes constituting a variable resistance arm of said resistance bridge; a voltage source; switching means for connecting said voltage source across said resistance bridge; a timing mechanism for controlling said switching means; a polarized relay responsive to the condition of balance of said resistance bridge; a solenoid valve controlled by said polarized relay; a lawn sprinkling system, the water supply of which is controlled by said solenoid valve; and means for inserting an adjustable resistance in series with said electrodes at substantially the same time as said solenoid valve is opened.

7. Soil moisture control apparatus comprising in combination: a pair of electrodes in contact with the soil; a voltage source; switching means for connecting said voltage source across said electrodes; a timing mechanism which momentarily closes said switching means; current discriminating means in series with said electrodes; an adjustable resistance in series with said current discriminating means; a relay responsive to said current discriminating means, said relay having at least two normally open contacts; a solenoid valve controlled by one of said normally open contacts; shunting means across the aforementioned momentary contact controlled by the second of said normally opened relay contacts; and an adjustable resistance in series with the second of said normally open relay contacts.

8. Soil moisture regulating apparatus comprising in combination: an irrigation system consisting of at least a water supply and a pipe, said pipe being in contact with the soil; an electrode in contact with the soil a substantial distance from said pipe; a voltage source; switching means for connecting said voltage source across said pipe and said electrode, whereby the pipe constitutes a second electrode; current discriminating means in series with said functional electrodes; a solenoid valve controlled by said current discriminating means whereby said solenoid valve controls the flow of water through said pipe; and means for inserting an adjustable resistance in series with said electrodes at substantially the same time as said solenoid valve is opened.

References Cited in the file of this patent

UNITED STATES PATENTS

| | | |
|---|---|---|
| 2,031,146 | Dodge | Feb. 18, 1936 |
| 2,578,981 | Parker | Dec. 18, 1951 |
| 2,599,862 | Ray | June 10, 1952 |
| 2,611,643 | Higgins | Sept. 23, 1952 |